Dec. 8, 1970          R. L. COOK          3,546,039
METHOD FOR MAKING PUNCTURE RESISTANT MATERIAL
Filed Feb. 17, 1967

INVENTOR
RICHARD L. COOK
BY:
*Oldham & Oldham*
ATTORNEYS

United States Patent Office 3,546,039
Patented Dec. 8, 1970

3,546,039
METHOD FOR MAKING PUNCTURE RESISTANT MATERIAL
Richard L. Cook, 4841 W. Elm,
Phoenix, Ariz. 85031
Filed Feb. 17, 1967, Ser. No. 616,853
Int. Cl. B31f 1/20
U.S. Cl. 156—210                           6 Claims

ABSTRACT OF THE DISCLOSURE

A method for making a puncture resistant material of a crinkled sheet of plastic laminated to a ballistic belt. A technique for crinkling the plastic sheet to a greatly reduced overall surface area is provided. The plastic sheet is a thermoplastic material and the crinkled relation is permanently set therein.

---

This invention relates to a method for making a puncture resistant material, and more particularly to the making of a material applicable for use with liquid fuel tanks to prevent rupturing thereof upon the crash of a vehicle carrying the tanks, or upon the impact of flying projectiles.

This application defines the method to make the material disclosed in my copending patent application Ser. No. 615,639, filed Feb. 13, 1967, and entitled "Puncture Resistant Material." Specifically, this material is utilized to protect liquid fuel tanks from rupturing either upon impact caused by the crash of a vehicle carrying the tank, or by the impact of a projectile thereagainst. The method for making the material is extremely important. This is a material which will distribute the kinetic energy of a localized impact over a wide area to effectively defeat the puncturing force. Prior art efforts to develop materials of this type have not been successful, and it is the general object of this invention to set forth a method to overcome these prior art deficiencies.

The general object of the invention is achieved by crinkling, folding, or otherwise manipulating a non-permeable membrane made from suitable materials such as thermoplastics, synthetic foils, metal foils, or other plastic films, so as to reduce its overall area about five to ten times from its original flattened state to its crinkled flattened shape. This material is then capable of multilateral expansion of at least about 300% which effectively transfers kinetic energy on a localized impact over a much greater area defeating the puncture impact forces being applied.

Another object of the invention is to define a method for making a puncture resistant laminate utilizing a crinkled core with a ballistic felt to provide a material capable of multilateral expansion, and greater puncture resistant properties at a low cost.

The objects of the invention are achieved by providing a method for making a puncture resistant material which includes the steps of crinkling a flat sheet of a suitable membrane into a greatly reduced area, but flat shaped, and heating the crinkled sheet above the deformation temperature thereof and then cooling to set the crinkled relation into the sheet.

For a better understanding of the method of the invention, reference should be had to the accompanying drawings, wherein.

Figure 1:
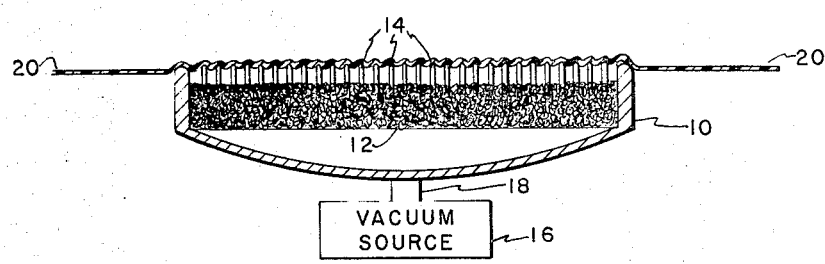
FIG. 1 is a perspective schematic illustrating one method for creating the crinkled relationship in the non-permeable membrane.

With reference to the form of the invention illustrated in the drawings, the numeral 10 represents a vacuum table into which is received a thick foam pad 12. The pad 12 has a plurality of wooden pegs, indicated generally by numeral 14, firmly positioned therein and extending substantially vertically or perpendicular to the surface thereof. The pegs 14 are cylindrical and have rounded end surfaces. In the specific embodiment of the invention, the foam pad 12 is approximately three inches thick to provide great stability for the pegs 14 which are spaced approximately one inch apart in uniform relation to each other, and extend approximately one and one half inches above the surface of the pad 12. A vacuum source 16 draws a vacuum on table 10 through a tube 18. Normally, the invention contemplates that the pad 12 will be of an open cell type foam which allows air to be drawn therethrough, and effectively stabilizes the pad 12 and consequentially further stabilizes the pegs 14 in relationship thereto.

The material of the invention is illustrated in FIG. 1 as being a transparent non-permeable thermoplastic membrane 20 shown in flat sheet form laying over the top of the pegs 14 on the pad 12. The purpose of the form or method of FIG. 1 is to effectively crinkle, fold, or otherwise manipulate the flat wheel 20 from its indicated flat area size to a flattened size of greatly reduced area as the material is sucked down over the pegs 14 by the vacuum drawn through the foam, as indicated in FIG. 1.

Figure 2:
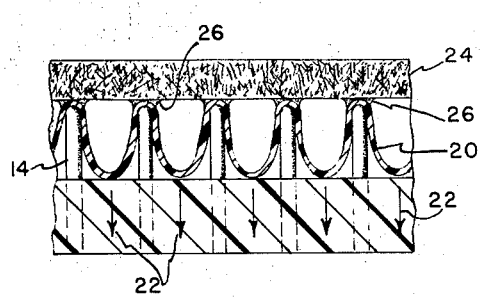
FIG. 2 is an enlarged broken away elevational view of the membrane formed to the crinkled relationship by the method of FIG. 1 with a ballistic felt attached thereto.

For example, with the peg spacing as indicated above, the membrane 20 will be reduced between five to ten times in area as it is sucked down over the pegs 14 by the vacuum drawn through the foam pad 12. FIG. 2 more clearly illustrates the sucking action of the vacuum indicated by the arrows 22, draws the membrane 20 down in peaks and valleys over the pegs 14. Since the pegs are approximately one half inch longer than their lateral spacing, the peaks and valleys draw the membrane 20 into a reduced area of about one fifth to one tenth the size of the original area. Note, also in FIG. 2 how the pegs 14 extend substantially completely through the foam pad 12 in order to have great stability to overcome tendency to tip or rotate upon the application of the vacuum through the pad 12. In at least certain instances the pegs 14 could extend 1½ inches through the pad 12 on the other side and a similar crinkled forming of another membrane could take place at the same time. In that instance the vacuum would be drawn into the foam so both sheets would suck down over the pegs protruding from both flat surfaces.

Figure 3:
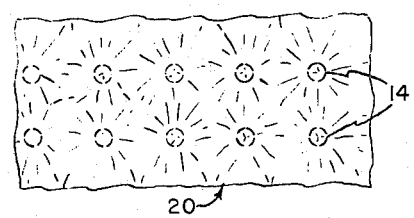
FIG. 3 is an enlarged broken away plan view of the material formed to its crinkled relationship in FIG. 1.

FIG. 3 illustrates in a plan view how the pegs 14 are arranged and how the membrane 20 is sucked down thereover to form peaks and valleys as the membrane 20 is reduced in size, by such a crinkling, or folding process.

In order to make a laminate in combination with the crinkled membrane 20, the invention contemplates the addition of a ballistic felt layer 24, attached to the peaks, as illustrated in FIG. 2. Since the felt 24 is naturally quite absorbent, the process calls for applying a suitable adhesive resin 26 to the tips or peaks of the membrane 20, and allowing such adhesive to become quite tacky before pushing or forcing the felt layer 24 thereagainst. If the adhesive has been allowed to become partially tacky or dry, then it will not be absorbed into the layer 24 and hence a good adhesive bond to the peaks of membrane 20 will be achieved. A polyurethane resin may be used to achieve this object, and could be applied by a roller, or suitable doctor bar, or the like. The felt layer 24 may be applied while the vacuum forming is holding the membrane 20 in position. In fact, in most instances this may be the most preferable, since at the same time the ambient temperature of the membrane or surrounding temperature will be raised to above the deformation temperature of the membrane 20, which will set the crinkled relationship formed by the vacuum thereinto, and also hasten the setting of the adhesive resin 26 bonding the felt layer 24 thereto. The invention contemplates that the deformation temperature will be that temperature at which permanent molecular change takes place and the material loses its elastic memory, or tendency to return to its original shape. When the membrane 20 has been set by raising it above its deformation temperature, the vacuum may be removed, and the membrane 20 simply peeled off the pegs 14. In most instances, it is not desirable to have the temperature of membrane 20 at or slightly above its deformation temperature before applying the vacuum or crinkling step, as this will cause local dimpling and limit the crinkling effect.

Figure 5:
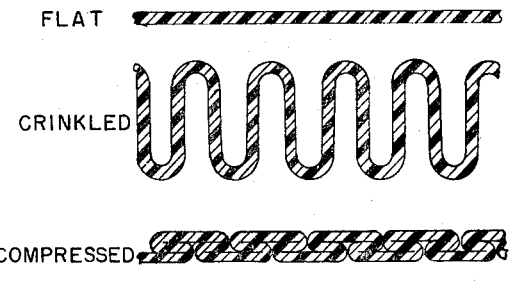
FIG. 5 is a block diagram indication of the sequential steps necessary for the formation of the crinkled core from a flat non-permeable membrane.

At this point the invention contemplates that the crinkled membrane 20 may be compressed to a much reduced thickness, as indicated in FIG. 5. This can occur with the felt layer 24 attached thereto, and is accomplished simply by utilizing a suitable press or a stronger vacuum to simply press down the raised peaks. As the material is compressed, the temperature will again be raised to above the deformation temperature to set the material in its compressed relationship; if the material is not in fact already at the deformation temperature.

In the specific example of the invention, fluorocarbons, polyethylenes, polyamides, polyvinyl fluorides, and polyvinyl chlorides and the like thermoplastic material may be used for the membrane 20, and in this specific embodiment the thickness thereof will be approximately two mils. When it is compressed as indicated in the step shown in FIG. 5, its thickness will be approximately six to eight mils. Hence, it is seen that an extremely compacted or crinkled material is formed with the method of the invention. Metal foils, such as aluminum, laminated to a plastic backing might also be used.

However, it must be remembered that in at least certain instances it may be desirable to utilize the membrane 20 alone, or in combination with the felt in the uncompressed relationship as for some instances the uncompressed relationship has greater puncture resistance than if compressed. Effectively, the multilateral spreading of the membrane 20 is generally easier to achieve without rupture or failure if it is uncompressed. However, bulk becomes a consideration, and must be evaluated for the final embodiment desired.

Figure 4:
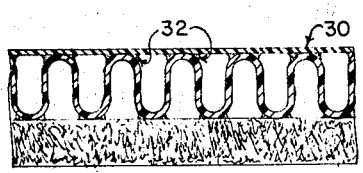
FIG. 4 is an enlarged broken away vertical cross sectional view of the final laminate material formed by the process of the invention.

The invention contemplates that for liquid fuel tank construction, a non-permeable liner will be added to the crinkled membrane 20, and this liner 30 is indicated in FIG. 4. A suitable material for the liner would be a nylon film or a combination of nylon and urethane elastomer films. Even though the membrane 20 is non-permeable, and thus possible could be utilized for the lining of a liquid fuel tank, because of its crinkled relationship, and the possibility of some pinhole leaks, the liner 30 is desirable. However, since the liner 30 will not have the stretching capabilities of either the ballistic felt layer 24 or the membrane 20, and hence must be adhesively secured to the peaks only of the membrane 20 with suitable adhesive to allow failure upon local impact. It must be allowed to rupture without impeding the distortion of the layer 24 or the membrane 20. Thus, the adhesive 32 indicated as applying layer 30 to the peaks of the crinkled membrane 20 may be a polysulfide rubber, for example, which will fail allowing the membrane 20 to expand unimpeded to its flattened shape upon impact without being slowed or strained by the adhesive application to the fluid impervious liner 30.

The essence of the invention is achieved in the method of crinkling the membrane 20, and only one method has been illustrated herein. This method has proven to be the most successful because of the great uniformity in the crinkling achieved with the very firmly positioned pegs in the foam pad. Naturally, however, if production line facilities were required for this material, one could utilize many other mechanical embodiments of equipment to achieve a uniform crinkling, or folding reduction in the area size of the membrane. For example, pegs could be mounted on a continuously rotating roller which passes in a continuous manner over a continuous web of suitable material. Other production line techniques could be utilized. The main object is to achieve a uniform folding, or crinkling of the material in all directions so as to reduce its area size whereby impact in such reduced area size material tends to spread the material back to its original size, and hence allows a gentle, and gradual spreading of the kinetic energy carried by the impact force.

While an accordance with the Patent Statutes only one best known embodiment of the invention has been illustrated and described in detail, it is to be particularly understood that the invention is not limited thereto or thereby, but that the inventive scope is defined in the appended claims.

What is claimed is:

1. A method for making a puncture resistant material which includes the steps
   heating a flat sheet of a synthetic non-permeable thermoplastic material from a class consisting of fluorocarbons, polyethylenes, polyamides, polyvinyl fluorides, and polyvinyl chlorides to or just above the deformation temperature thereof,
   supporting the sheet only at a plurality of discrete locations on only one side of the sheet, the area of each support location being small,
   drawing a vacuum on the supported side of the sheet to suck the sheet material into a crinkled relation around each support location,
   compressing the crinkled sheet in the plane thereof to a greatly reduced thickness from its crinkled condition,
   cooling to set the compressed crinkled relationship into the sheet,
   applying a compatible resin adhesive to the peaks on one side of the crinkled sheet, and
   adhesively securing a ballistic felt of the same size as the crinkled sheet to the adhesive on the peaks thereof in an adjacent laminated relationship.

2. A method according to claim 1 which includes adhesively securing a non-permeable smooth membrane to the peaks on the other side of the crinkled sheet with an adhesive which will fail under the multilateral expansion of the crinkled sheet caused by the kinetic energy of an impacting force.

3. A method according to claim 1 where the sheet is reduced in size in all directions to reduce its area by between five to ten times from its original size by the crinkling process.

4. A method according to claim 1 where the sheet is about .002 inch in thickness and the pegs extend about 1½ inches from the surface of the base and are approximately 1 inch apart in uniform relation to each other, and where the base is an open cell foam pad.

5. Said process according to claim 1 which includes applying a non-permeable liner to the crinkled sheet material on one surface thereof by adhesive securing only to the peaks of the material, said adhesive allowing failure between the liner and the material upon local impact thereby allowing the material to expand unimpeded upon impact.

6. A method according to claim 1 where the sheet is about .002 inch in thickness and the support locations allow a crinkling relationship of the sheet around such locations a distance of about 1½ inches, and such locations are approximately 1 inch apart in uniform relation to each other.

References Cited

UNITED STATES PATENTS

| | | | |
|---|---|---|---|
| 3,142,599 | 7/1964 | Chavannes | 156—210 |
| 2,102,937 | 12/1937 | Bauer | 156—205 |
| 2,670,501 | 3/1954 | Michiels | 156—210 |
| 2,874,408 | 2/1959 | Vieli et al. | 156—470 |
| 2,926,720 | 3/1960 | Gosman | 156—205 |
| 3,026,231 | 3/1962 | Chavannes | 156—205 |

SAMUEL W. ENGLE, Primary Examiner

U.S. Cl. X.R.

156—183, 470; 161—404